US012581364B2

(12) United States Patent

Schiocchet et al.

(10) Patent No.: US 12,581,364 B2

(45) Date of Patent: Mar. 17, 2026

(54) VIDEO STREAMING PATTERN DETECTION AND BURST PREDICTION

(71) Applicant: QUALCOMM Incorporated, San Diego, CA (US)

(72) Inventors: Marcelo Schiocchet, San Diego, CA (US); Kausik Ray Chaudhuri, San Diego, CA (US); Ayman Tharwat Abdelhamid, San Diego, CA (US); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 18/172,271

(22) Filed: Feb. 21, 2023

(65) Prior Publication Data

US 2024/0284256 A1    Aug. 22, 2024

(51) Int. Cl.
*H04W 28/08* (2023.01)

(52) U.S. Cl.
CPC ... *H04W 28/0942* (2020.05); *H04W 28/0867* (2020.05); *H04W 28/0967* (2020.05)

(58) Field of Classification Search
CPC ......... H04W 28/0967; H04W 28/0942; H04W 28/0867; H04W 28/24; H04W 24/08; H04W 24/02; H04W 76/20; H04W 28/0273; H04W 28/0263; H04W 28/0268; H04W 72/543; H04W 72/1268; H04W 28/082

See application file for complete search history.

(56) References Cited

U.S. PATENT DOCUMENTS

| | | | | |
|---|---|---|---|---|
| 11,528,769 B2 * | 12/2022 | Cheng | ................... | H04W 76/19 |
| 11,824,783 B2 * | 11/2023 | Sun | ......................... | H04L 67/14 |
| 11,950,277 B2 * | 4/2024 | Liu | ..................... | H04W 72/543 |
| 12,238,194 B2 * | 2/2025 | Chakraborty | ......... | H04L 1/0047 |
| 2004/0253927 A1 * | 12/2004 | Qiu | ........................ | H04L 1/0068 |
| | | | | 455/67.13 |
| 2006/0264180 A1 * | 11/2006 | Qiu | ........................ | H04L 1/0091 |
| | | | | 455/69 |
| 2009/0080495 A1 * | 3/2009 | Kwak | ................ | H04B 1/71055 |
| | | | | 375/349 |
| 2020/0405538 A1 * | 12/2020 | Mandell | ............... | A61K 31/519 |
| 2022/0060925 A1 * | 2/2022 | Kumar | .............. | H04W 28/0242 |

(Continued)

*Primary Examiner* — Jung Liu

(74) *Attorney, Agent, or Firm* — Procopio, Cory, Hargreaves & Savitch

(57) ABSTRACT

An apparatus for data processing and related non-transitory computer-readable medium are provided. In the method, the apparatus computes a burst threshold for a data stream. The burst threshold is associated with a throughput of the data stream. The apparatus further identifies a set of bursts in the data stream based on the burst threshold, and detect a pattern in the data stream based on the set of bursts. The apparatus further estimates at least one subsequent burst in the data stream based on the pattern and the burst threshold, and outputs an indication of the at least one subsequent burst in the data stream. The method enables a device to predict one or more future data bursts based on characteristics of existing data. The predicted data bursts allow the transmission resource and power to be adaptively arranged to significantly reduce power consumption and improve transmission efficiency.

30 Claims, 13 Drawing Sheets

(56) References Cited

U.S. PATENT DOCUMENTS

| | | | |
|---|---|---|---|
| 2022/0264359 A1* | 8/2022 | Bi | H04W 28/24 |
| 2023/0067851 A1* | 3/2023 | Zeng | H04W 28/0268 |
| 2023/0090081 A1* | 3/2023 | Balasubramanian | |
| | | | H04W 28/24 |
| | | | 370/252 |
| 2023/0134051 A1* | 5/2023 | Chakraborty | H04L 7/0054 |
| | | | 714/726 |
| 2024/0107363 A1* | 3/2024 | Maamari | H04L 43/0852 |
| 2024/0129786 A1* | 4/2024 | Dou | H04W 76/38 |
| 2024/0267778 A1* | 8/2024 | Kanamarlapudi | H04W 76/20 |
| 2024/0284241 A1* | 8/2024 | Zou | H04L 47/24 |
| 2025/0062935 A1* | 2/2025 | McCormick | H04B 7/18517 |
| 2025/0192876 A1* | 6/2025 | McCormick | H04L 27/2636 |

* cited by examiner

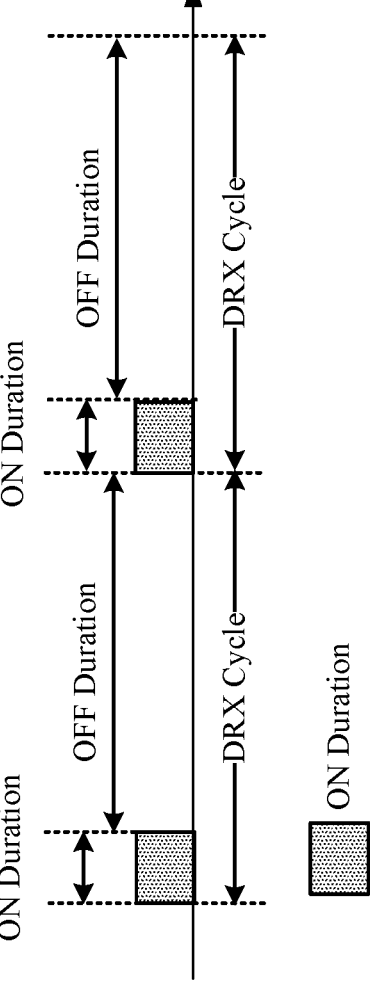
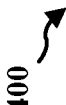
FIG. 4

700

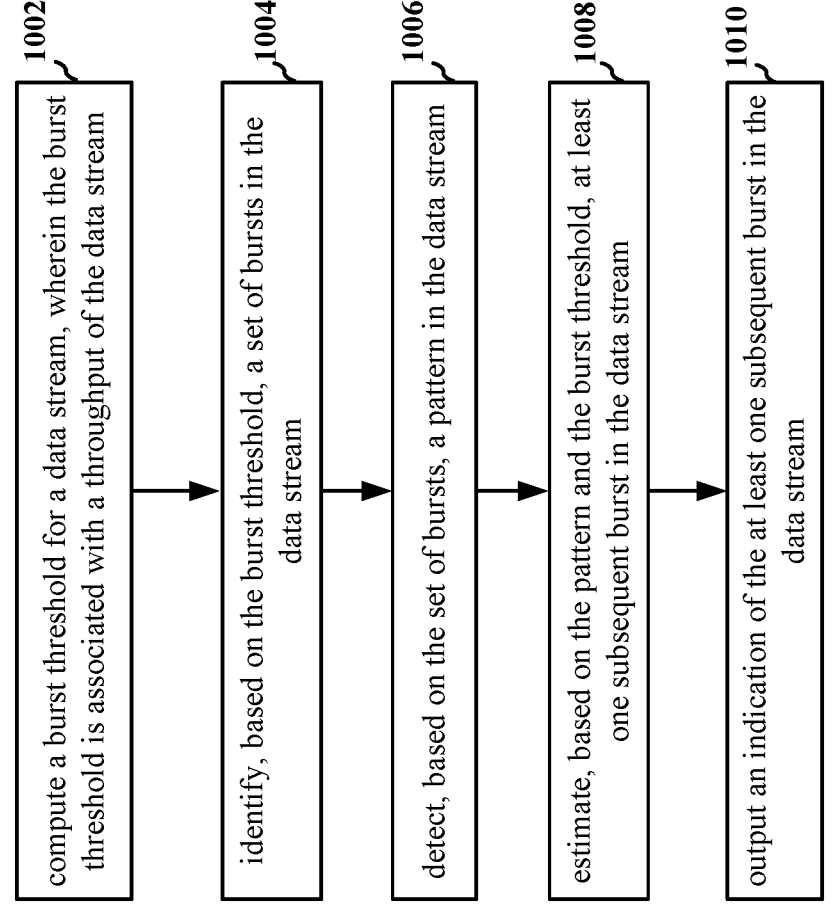

1000

1002 compute a burst threshold for a data stream, wherein the burst threshold is associated with a throughput of the data stream 1004 identify, based on the burst threshold, a set of bursts in the data stream 1006 detect, based on the set of bursts, a pattern in the data stream 1008 estimate, based on the pattern and the burst threshold, at least one subsequent burst in the data stream 1010 output an indication of the at least one subsequent burst in the data stream

FIG. 10

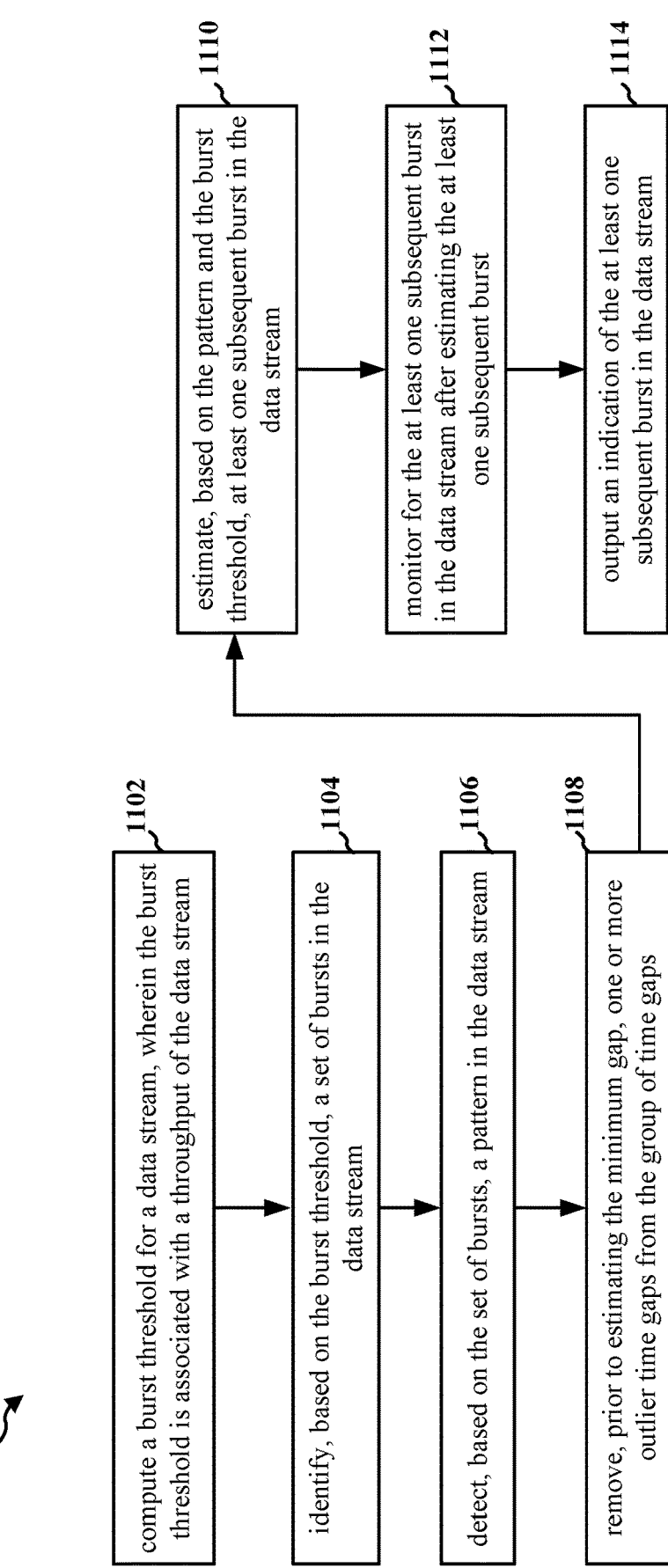

1100

1102 — compute a burst threshold for a data stream, wherein the burst threshold is associated with a throughput of the data stream 1104 — identify, based on the burst threshold, a set of bursts in the data stream 1106 — detect, based on the set of bursts, a pattern in the data stream 1108 — remove, prior to estimating the minimum gap, one or more outlier time gaps from the group of time gaps 1110 — estimate, based on the pattern and the burst threshold, at least one subsequent burst in the data stream 1112 — monitor for the at least one subsequent burst in the data stream after estimating the at least one subsequent burst 1114 — output an indication of the at least one subsequent burst in the data stream

FIG. 11

VIDEO STREAMING PATTERN DETECTION AND BURST PREDICTION

TECHNICAL FIELD

The present disclosure relates generally to communication systems, and more particularly, to video streaming pattern detection and burst prediction.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for data processing at a device. The apparatus may include memory and at least one processor coupled to the memory. Based at least in part on information stored in the memory, the at least one processor may be configured to compute a burst threshold for a data stream. The burst threshold may be associated with a throughput of the data stream. The at least one processor may be further configured to identify a set of bursts in the data stream based on the burst threshold; detect a pattern in the data stream based on the set of bursts;

estimate at least one subsequent burst in the data stream based on the pattern and the burst threshold; and output an indication of the at least one subsequent burst in the data stream.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating an example of a discontinuous reception (DRX) cycle in wireless communication.

FIG. 10 is the first flowchart illustrating methods of data processing at a UE in accordance with various aspects of the present disclosure.

FIG. 11 is the second flowchart illustrating methods of data processing at a UE in accordance with various aspects of the present disclosure.

DETAILED DESCRIPTION

Figure 1:
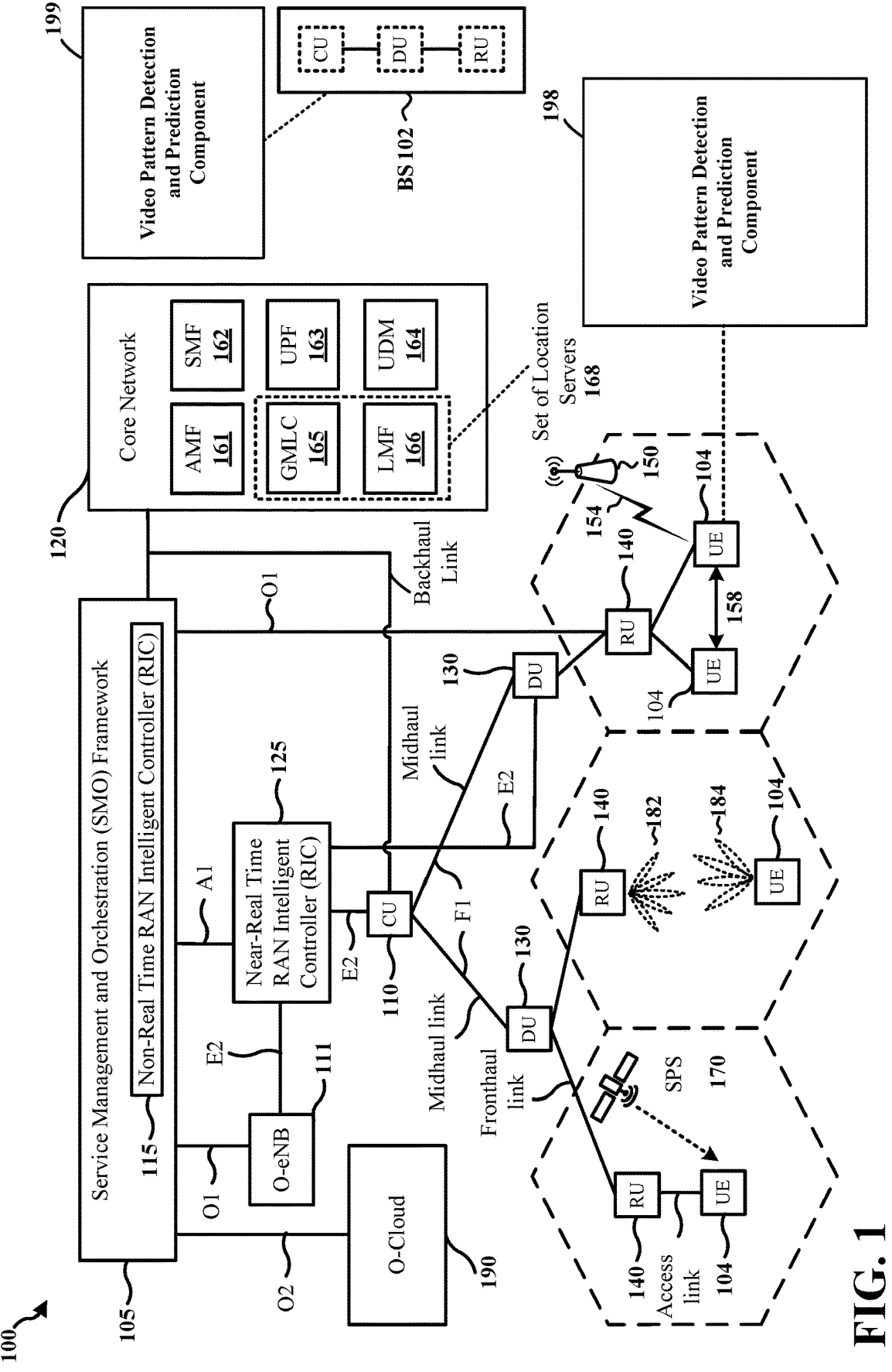
FIG. 1 is a diagram illustrating an example of a wireless communication system and an access network.

Various aspects relate generally to wireless communication and, more particularly, to methods and apparatus for video streaming pattern detection and burst prediction. Some aspects more specifically relate to a method of data processing at a device. The method may include computing a burst threshold for a data stream. The burst threshold may be associated with a throughput of the data stream. The method may further include identifying a set of bursts in the data stream based on the burst threshold, detecting a pattern in the data stream based on the set of bursts, estimating at least one subsequent burst in the data stream based on the pattern and the burst threshold, and outputting an indication of the at least one subsequent burst in the data stream. In some examples, the method may further include monitoring for the at least one subsequent burst in the data stream after being configured to estimate the at least one subsequent burst. In some examples, the burst threshold for the data stream may be computed by: dividing the data stream in a time window into a plurality of data portions, where each data portion of the plurality of data portions has the same length and the plurality of data portions are non-overlapping, calculating the downlink (DL) throughput for each data portion of the plurality of data portions, and obtaining an indication of the burst threshold based on the DL throughput for each data portion of the plurality of data portions.

Particular aspects of the subject matter described in this disclosure can be implemented to realize one or more of the following potential advantages. In some examples, by estimating at least one subsequent burst in the data stream based on the pattern and the burst threshold associated with the data stream, the described techniques can be used to enable a device to predict one or more future data bursts based on characteristics of existing data. The predicted data bursts allow the transmission resource and power to be adaptively arranged to significantly reduce power consumption and improve transmission efficiency.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well-known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units.

Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low-power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a Video Pattern Detection and Prediction component 198. The Video Pattern Detection and Prediction component 198 may be configured to compute a burst threshold for a data stream. The burst threshold may be associated with a throughput of the data stream. The Video Pattern Detection and Prediction component 198 may be further configured to identify a set of bursts in the data stream based on the burst threshold, detect a pattern in the data stream based on the set of bursts, estimate at least one subsequent burst in the data stream based on the pattern and the burst threshold, and output an indication of the at least one subsequent burst in the data stream. In certain aspects, the base station 102 may include a Video Pattern Detection and Prediction component 199. The Video Pattern Detection and Prediction component 199 may be configured to compute a burst threshold for a data stream. The Video Pattern Detection and Prediction component 199 may be further configured to identify a set of bursts in the data stream based on the burst threshold, detect a pattern in the data stream based on the set of bursts, estimate at least one subsequent burst in the data stream based on the pattern and the burst threshold, and output an indication of the at least one subsequent burst in the data stream. Although the following description may be focused on 5G NR, the concepts described herein may be applicable to other similar areas, such as LTE, LTE-A, CDMA, GSM, and other wireless technologies.

Figures 2A, 2B, 2C, 2D:
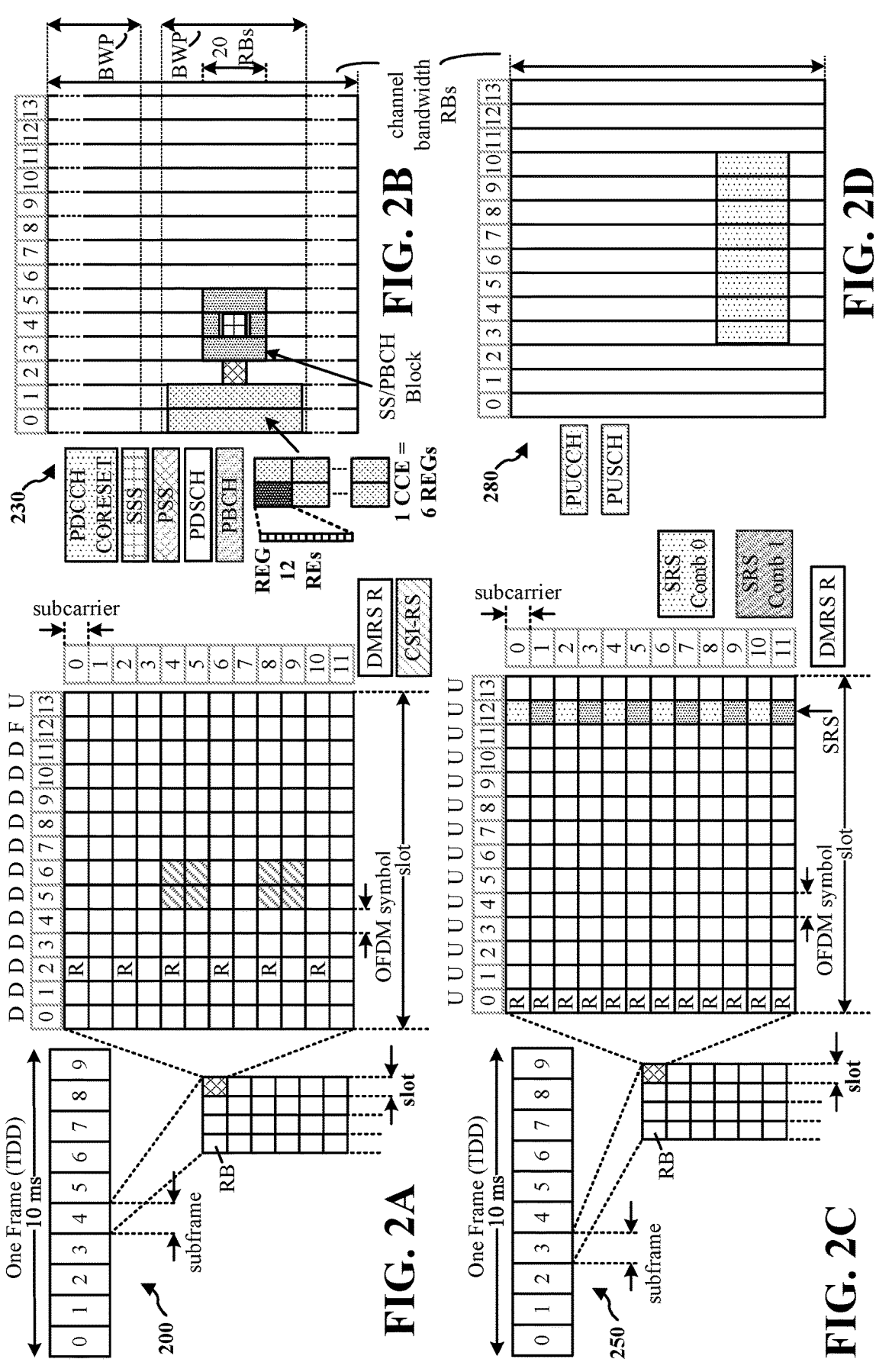
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu} * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
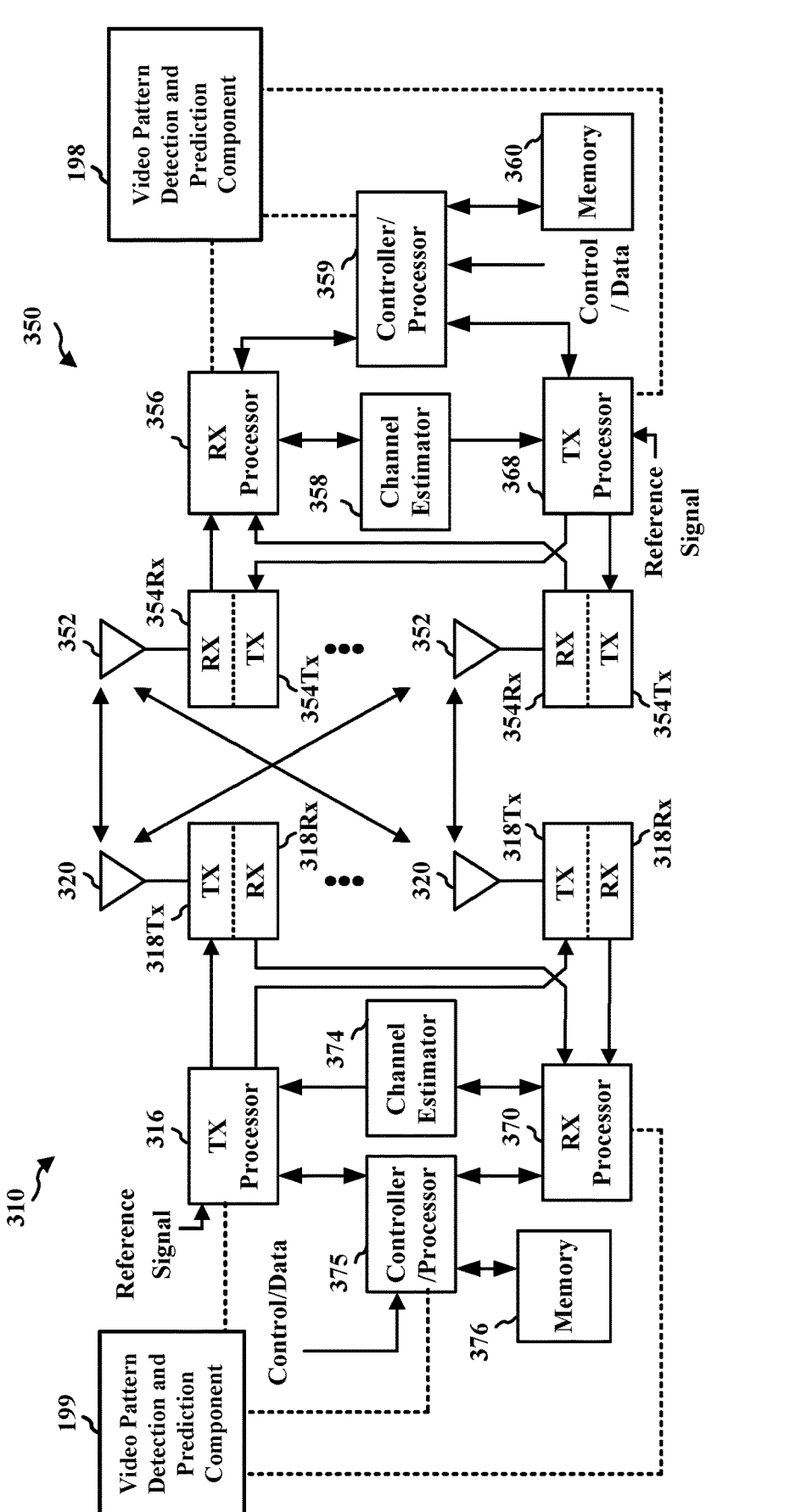
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the Video Pattern Detection and Prediction component 198 of FIG. 1.

At least one of the TX processor 316, the RX processor 370, and the controller/processor 375 may be configured to perform aspects in connection with the Video Pattern Detection and Prediction component 199 of FIG. 1.

In RRC idle and inactive states, radio resource management (RRM) and paging consume significant UE power. For example, in RRM, the UE periodically performs layer 3 reference signal received power (L3-RSRP) measurements on SSBs transmitted by a serving cell of the UE and neighbor cells of the UE. Such L3-RSPRP measurements consume power. In another example, in paging, the UE periodically monitors a paging occasion (PO) during each idle discontinuous reception (I-DRX) cycle. In a DRX mode, the UE may monitor a PDCCH channel discontinuously using a sleep and wake cycle, e.g., DRX OFF durations and DRX ON durations. When the UE is in an RRC-connected state, the DRX may also be referred to as Connected Mode DRX (C-DRX). If the UE is in an RRC idle state, the DRX may be referred to as I-DRX. In a non-DRX mode, the UE monitors for PDCCH in each subframe to check whether there is downlink data available. Continuous monitoring of the PDCCH uses more battery power at the UE, and DRX conserves battery power at the UE.

FIG. 4 illustrates an example of a DRX cycle 400, including periodic ON durations during which the UE monitors for PDCCH and OFF durations during which the UE may not monitor for the PDCCH. The OFF duration may be referred to as a DRX opportunity, in some aspects. During the OFF duration, the UE does not monitor for PDCCH. The UE may enter a sleep mode or a low-power mode in which the UE minimizes power consumption by shutting down an RF function without detecting communication from the base station.

Figure 5:
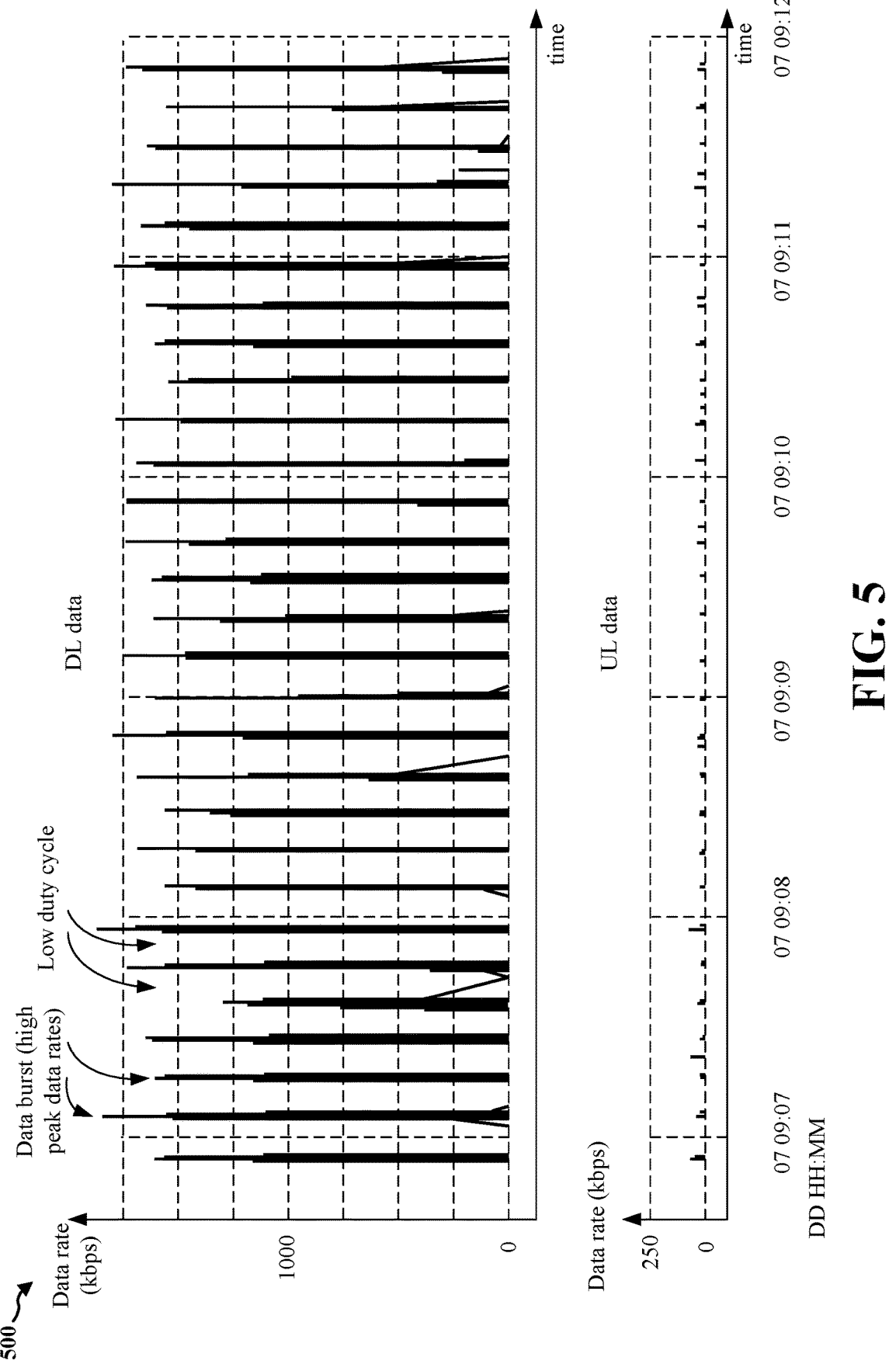
FIG. 5 is a diagram illustrating data patterns in an example video streaming application.

Video streaming is one category of wireless communication whose data transmission patterns allow a good burst gaps prediction. FIG. 5 is a diagram 500 illustrating data patterns in an example video streaming application. As shown in FIG. 5, the DL data and the UL data of the example video streaming application have periodical patterns. In some examples, the video streaming data may have a peak data rate of more than 1 gigabytes-per-second (Gbps) in a steady state. To accommodate the periodic high peak data rate, the UE receiving the video streaming data may operate in a high Spectral Efficiency (SPEF) or a high throughput mode, leading to a faster C-DRX sleep. As shown in FIG. 5, the video streaming data also has low-duty cycles in a steady state. These low-duty cycles may provide opportunities to save power between data bursts. A UE may operate in a low SPEF or a low throughput mode during the gaps between the data bursts to save power. In this disclosure, the low SPEF or the low throughput mode may refer to any power-saving technique that may save power while reducing the peak throughput or SPEF capability. For example, the UE may enter sleep mode during the gaps between the data bursts to save power. In a video streaming application, the steady state may last a long period of time. For example, a movie may last two hours, and series episodes may each last 20-50 minutes. Hence, power-saving techniques for video streaming applications may significantly reduce power consumption and improve transmission efficiency.

The present disclosure provides methods and devices for video streaming pattern detection and burst prediction. The pattern detection and burst prediction method may apply to data streams or video streams with different throughputs, burst lengths, duty cycles, and periodicities. The pattern detection and burst prediction method may also handle mixed-traffic and non-streaming states. In this disclosure, the term "data stream" or "video stream" may refer to data or video that is transmitted continuously over a certain period of time, and the term "burst" or "data burst" may refer to the transmission of a relatively large amount of data over a short period of time.

Figure 6:
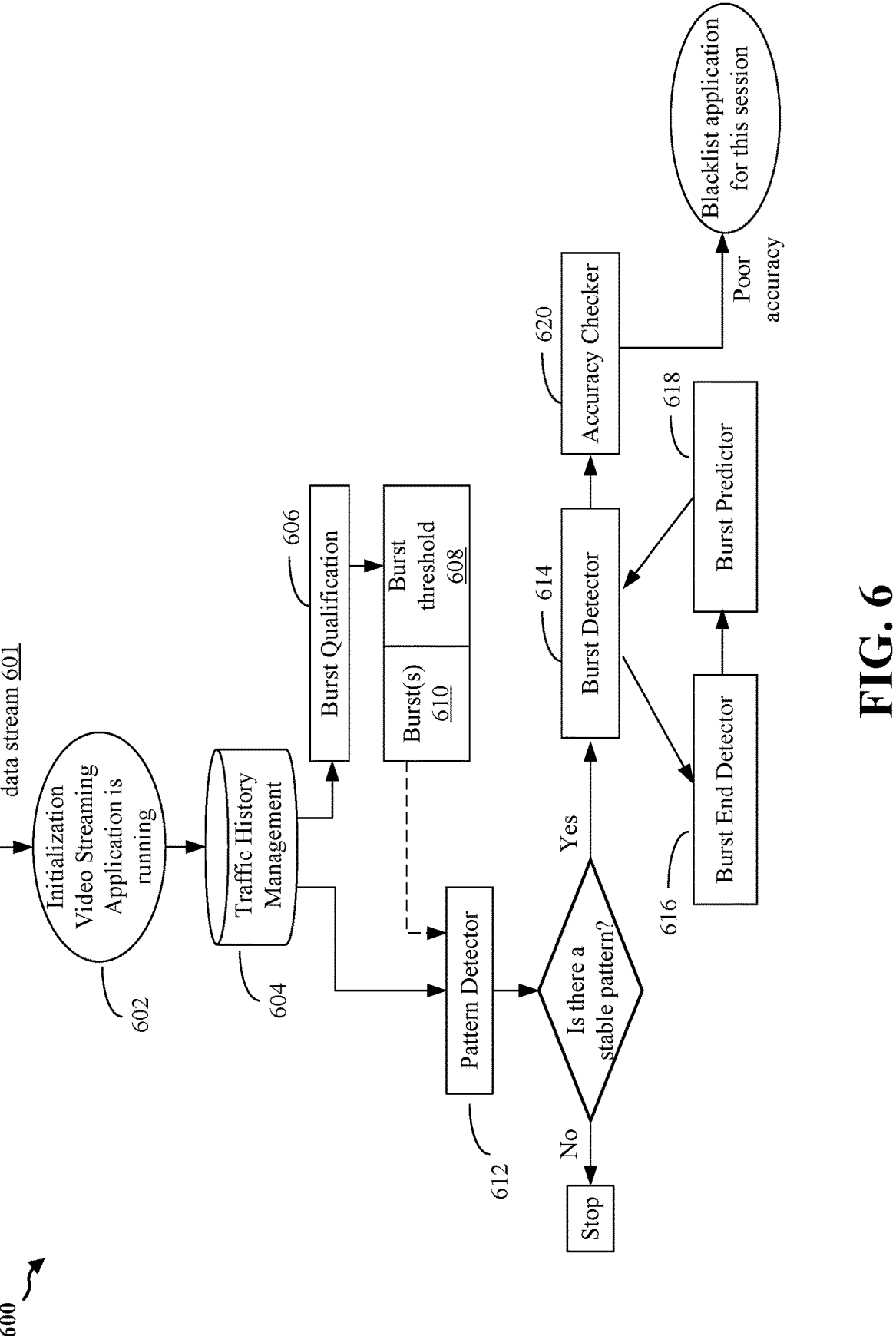
FIG. 6 is a flow diagram illustrating data patterns in an example video streaming application in accordance with various aspects of the present disclosure.

FIG. 6 is a flow diagram 600 illustrating the pattern detection and burst prediction method in accordance with various aspects of the present disclosure. The method may be performed by a device, such as a UE, a base station, a video streaming device or a data streaming device. As shown in FIG. 6, in some aspects, the pattern detection and burst prediction method may include several blocks or steps. These blocks or steps may include an initialization step 602, a traffic history management step 604, a burst qualification step 606, a pattern detector 612, a burst detector 614, a burst end detector 616, a burst predictor 618, and an accuracy checker 620.

In some aspects, in the initialization step 602, the device may identify whether a video streaming application is running. In some examples, a list of video streaming applications may be provided, and the device may identify whether a video streaming application is running based on the list of video streaming applications. For example, if the device determines that the data stream 601 is associated with one of the video streaming applications in the list, the device may identify that a video streaming application is running.

If a video streaming application has been identified in the initialization step 602, the device may store a recent traffic history of the video streaming application for burst prediction and pattern identification purposes in the traffic history management step 604. In some aspects, the recent traffic history data may be compressed before being stored to achieve better memory or storage efficiency.

In some aspects, the burst qualification step 606 may identify one or more bursts 610 in the data stream 601. In the burst qualification step 606, the device may specify a throughput threshold or a burst threshold 608 for qualifying bursts in the data stream 601. The burst threshold 608 may be the throughput of the transmission over a certain period of time, and may be used to separate the bursts in a video streaming application from other smaller traffic. For example, if the device detects data traffic that has a throughput greater than the burst threshold 608, the data traffic may be identified as a burst. The throughput threshold or the burst threshold 608 may be selected based on various factors, such as the video quality, the network throughput, or the length of the burst. In some examples, the throughput threshold or the burst threshold 608 may be self-adaptive to these factors. That is, the device may specify different throughput thresholds under different transmission conditions.

In one example, the burst threshold 608 may be determined through the following steps. First, the device may first split a recent traffic history of the data stream 601, which may be received from the traffic history management step 604, into several non-overlapping windows. For example, each of the non-overlapping windows may have the same length (or duration) of 100 milliseconds. For each of the non-overlapping windows, the average DL throughput for this window may be calculated, and the Burst Volume Percentage (BVP) may be computed by:

$$BVP = \frac{burst\_volume}{total\_volume} \quad (1)$$

where burst_volume is the number of all the windows who have the average throughput above a trial throughput threshold, and total_volume is the total number of windows. The value of BVP depends on the value of the trial throughput threshold. The trail throughput threshold may be set to an initial value equal to the highest averaged throughput among all the windows. Then, the trial throughput threshold may be reduced from the initial value until the BVP is equal to or higher than a predetermined target value, $BVP_{target}$, and the trial throughput threshold may be set as the burst threshold 608. The window duration and $BVP_{target}$ may be parameters that can be optimized for each video streaming application. One burst may be defined as one or more consecutive windows whose throughput is higher than the burst threshold 608.

The pattern detector 612 may determine whether a periodically stable pattern exists in the video streaming application.

In one example, the device may determine whether the periodically stable pattern exists through the following steps. First, the pattern detector 612 may obtain information of one or more bursts 610 based on the burst threshold 608. Then, the pattern detector 612 may calculate the time distances (e.g., the burst gaps) between adjacent bursts and store the burst gaps. The pattern detector 612 may further calculate the statistic characteristics of the burst gaps, such as the mean $m_{gap}$ and the standard deviation $\delta_{gap}$ of the burst gaps. Based on the mean $m_{gap}$ and the standard deviation $\delta_{gap}$, the pattern detector 612 may calculate a gap standard deviation percentage GapStdPc by:

$$GapStdPc = \frac{\delta_{gap}}{m_{gap}} \quad (2)$$

A pattern may be considered periodically stable if GapStdPc is below a corresponding target threshold GapStdPC$_{target}$. In some examples, the target threshold GapStdPC$_{target}$ may be selected on a per-application basis.

If a periodically stable pattern is detected, the burst detector 614 may process the video streaming data to detect the bursts and the gaps between the bursts based on the burst threshold 608. The accuracy checker 620 may maintain a history of prediction accuracy and may disable the burst predictions if a low accuracy is detected. The detection of a new burst may be based on the burst threshold 608 and the non-overlapping windows obtained from the burst qualification step 606. A new burst may be detected when the throughput in a window rises from below the burst threshold 608 to above the burst threshold 608, and a gap may be detected when the throughput in a window drop from above the burst threshold 608 to below the burst threshold 608.

The burst end detector 616 may determine when the current burst has ended, and the burst predictor 618 may predict when the next burst will arrive (if a periodically stable pattern exists). If a periodically stable pattern is present, the minimum time gap duration until the next burst will be predicted. The predicted time gap duration may be based on the gap duration distribution (e.g., the mean $m_{gap}$ and the standard deviation $\delta_{gap}$ of the gaps, obtained by the pattern detector 612). In some examples, the gap duration may be predicted based on a low percentile of the distribution of the gaps in order to avoid predicting a gap larger than the actual gap. Predicting the duration of a gap smaller than the actual gap is safer than predicting the duration that is larger than the actual gap. When the predicted duration of a gap is smaller than the actual gap, the UE may resume high SPEF/high throughput capabilities in time for receiving the next burst. On the other hand, predicting a gap duration that is longer than the actual gap may be detrimental to the reception of the next burst. The percentile used may be a parameter that can be adjusted based on the operation conditions. In some examples, outliner gaps may be removed from the data used to compute the gap duration distribution before predicting the gap to the next burst. In some examples, the outliner gaps may be defined as gaps that are less than Q1−1.5×IQR or higher than Q3+1.5×IQR, where Q1 and Q3 are approximately the 25th percentile and approximately the $75^{th}$ percentile of the gaps, respectively, and IQR is the interquartile range of the group of gaps. As used herein, "approximately the X-th percentile" (where X is the percentile value) refers to a range of (X−1)-th percentile to (X+1)-th percentile. For example, "approximately the $25^{th}$ percentile" refers to a range of the $24^{th}$ percentile to the $26^{th}$ percentile.

Figure 7:
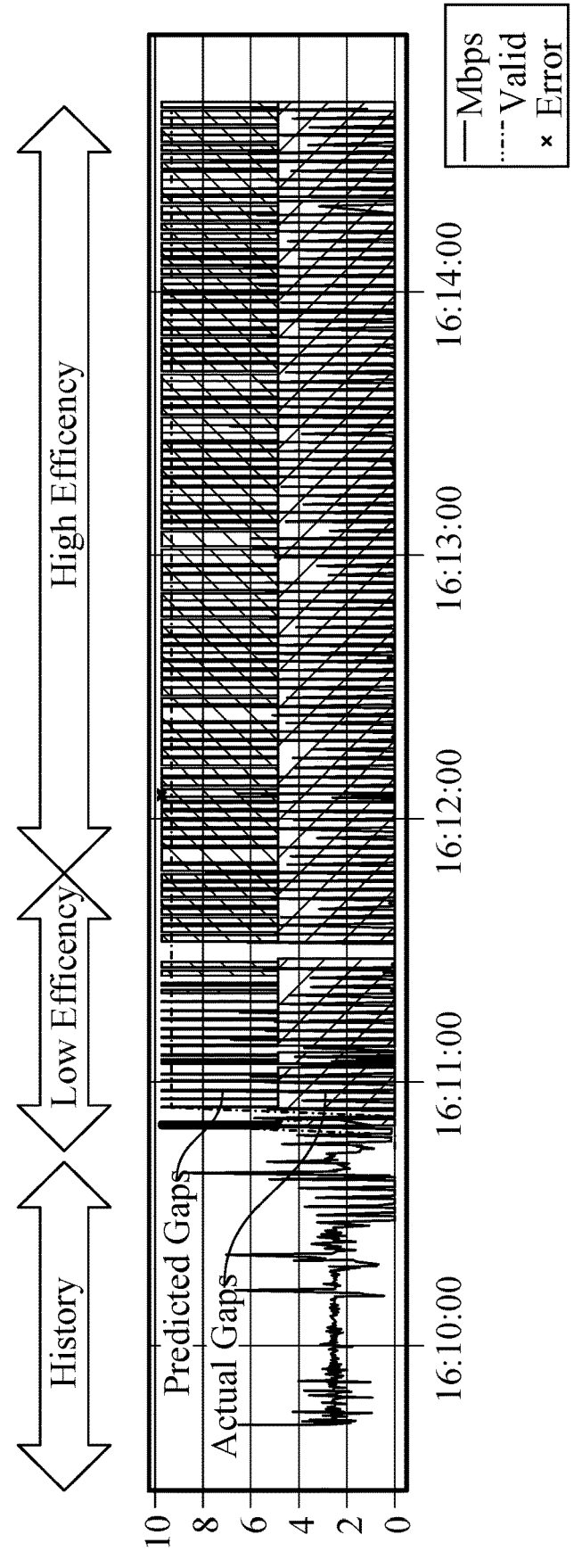
FIG. 7 is a diagram illustrating burst prediction results in an example video streaming application in accordance with various aspects of the present disclosure.

FIG. 7 is a diagram 700 illustrating burst prediction results in an example video streaming application in accordance with various aspects of the present disclosure. In the example of FIG. 7, the length of the non-overlapping window is 200 milliseconds, $BVP_{target}$=0.98, and GapStdPC$_{target}$=0.6. The streaming data in FIG. 7 starts with video buffering and may include mixed patterns (non-repetitive patterns). As shown in FIG. 7, to predict the bursts, the initial traffic history (e.g., the "History" section of the data in FIG. 7) may first be gathered. The predictions may start with low efficiency when the history contains mixed patterns, and the efficiency may increase as the pattern becomes more repetitive, which may be the dominant state for long videos. The burst gaps prediction results reach an accuracy of 97.41%, an efficiency of 80.44%, and a validity of 96.67%. In this disclosure, the accuracy of the prediction refers to a ratio of the number of gaps predicted with durations less than actual gap durations to the total number of predictions, and the efficiency of the predictions refers to a ratio of the mean predicted gap duration to the mean actual gap duration, and the validity of the prediction refers to a ratio of the total time when steady patterns were detected to the total time of the data streaming.

Figure 8:
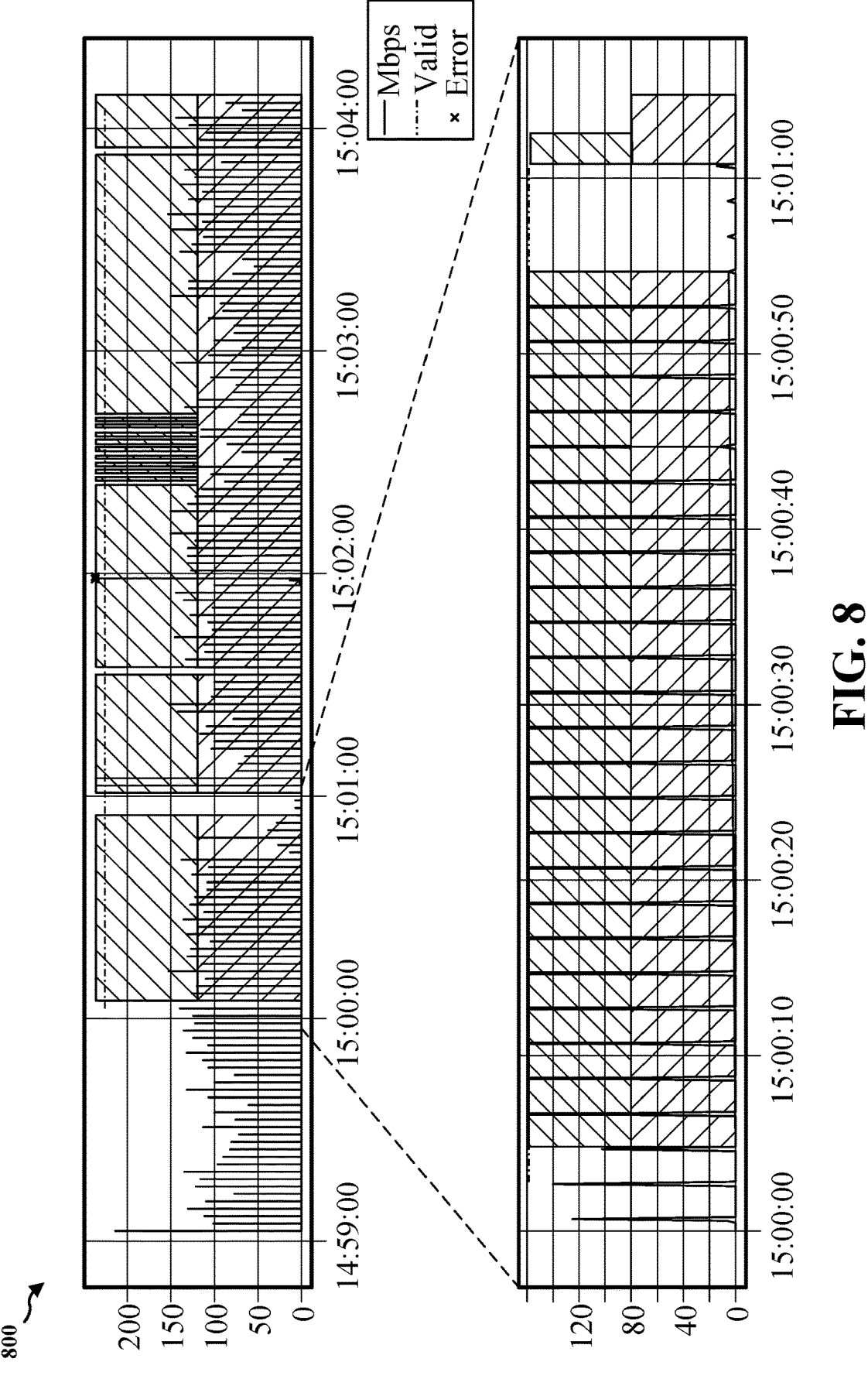
FIG. 8 is a diagram illustrating burst prediction results in another example video streaming application in accordance with various aspects of the present disclosure.

FIG. 8 is a diagram 800 illustrating burst prediction results in another example video streaming application in accordance with various aspects of the present disclosure. In the example of FIG. 8, the length of the non-overlapping window is 100 milliseconds, $BVP_{target}$=0.995, and Gap-StdPC$_{target}$=0.4. As shown in FIG. 8, the prediction gaps match well with the actual gaps. The burst gap prediction results reach an accuracy of 97.48%, an efficiency of 91.50%, and a validity of 100%.

Figure 9:
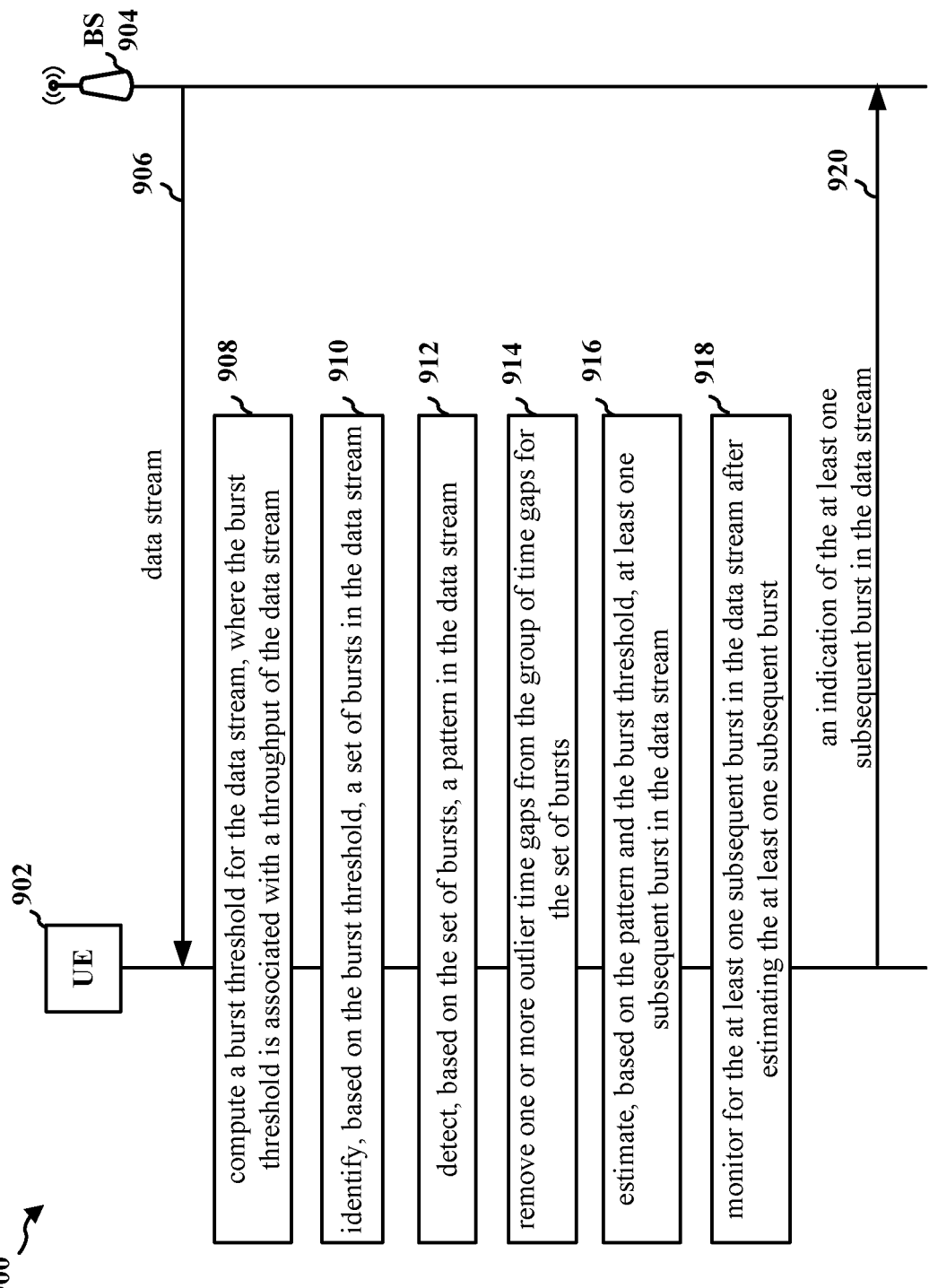
FIG. 9 is a call flow diagram illustrating a method of wireless communication in accordance with various aspects of the present disclosure.

FIG. 9 is a call flow diagram 900 illustrating a method of data processing at a UE in connection with a base station in accordance with various aspects of this present disclosure. A UE is used as an example device in the description in connection with flow diagram 900. The relevant steps performed by the UE may also be performed by a video streaming device, a base station, or a data streaming device. Some aspects are described for a base station 904, and these aspects may be performed by a base station in aggregation and/or by one or more components of a base station 904 (e.g., such as a CU 110, a DU 130, and/or an RU 140).

As shown in FIG. 9, at 906, a UE 902 may receive a data stream from the base station 904. For example, referring to FIG. 6, the UE 902 may receive a data stream 601 of an application at the initialization step 602.

At 908, the UE 902 may compute a burst threshold for a data stream. The burst threshold may be associated with a throughput of the data stream. For example, referring to FIG. 6, the UE may computer the burst threshold 608 for the data stream 601 through the burst qualification step 606. The burst threshold 608 may be computed based on the DL throughput associated with the data stream and Equation (1).

At 910, the UE 902 may identify, based on the burst threshold, a set of bursts in the data stream. For example, referring to FIG. 6, the UE may identify a set of bursts 610 in the data stream 601 based on the burst threshold 608.

At 912, the UE 902 may detect, based on the set of bursts, a pattern in the data stream. For example, referring to FIG. 6, the pattern detector 612 may detect a pattern (e.g., detect whether a periodically stable pattern exists) in the data stream based on the set of bursts 610. In some examples, the detection of the pattern may be based on Equation (2).

At 914, the UE 902 may remove one or more outlier time gaps from the group of time gaps for the set of bursts. A time gap in the group of time gaps may be the time interval between adjacent bursts in the set of bursts. The outlier time gaps may be determined based on the percentiles of the group of time gaps. For example, the outliner time gaps may be defined as time gaps that are less than Q1–1.5×IQR or higher than Q3+1.5×IQR, where Q1 and Q3 are approximately the 25$^{th}$ percentile and the 75$^{th}$ percentile of the time gaps, respectively, and IQR is the interquartile range of the group of time gaps.

At 916, the UE 902 may estimate, based on the pattern and the burst threshold, at least one subsequent burst in the data stream. For example, referring to FIG. 6, the burst predictor 618 may predict when the next burst will arrive.

At 918, the UE 902 may monitor for the at least one subsequent burst in the data stream after being configured to estimate the at least one subsequent burst.

At 920, the UE 902 may output an indication of the at least one subsequent burst in the data stream to the base station 904.

FIG. 10 is a flowchart 1000 illustrating methods of data processing at a device in accordance with various aspects of the present disclosure. A UE is used as an example device in the description in connection with flowchart 1000. The UE may be the UE 104, 350, 902, or the apparatus 1204 in the hardware implementation of FIG. 12. The method may also be performed by a video streaming device, a base station, or a data streaming device, and this disclosure is not limited in this regard. The method enables a device to predict one or more future data bursts based on characteristics of existing data. The predicted data bursts allow the transmission resource and power to be adaptively arranged to significantly reduce power consumption and improve transmission efficiency.

As shown in FIG. 10, at 1002, the UE may compute a burst threshold for a data stream. The burst threshold may be associated with a throughput of the data stream. FIGS. 6 and 9 illustrate various aspects of the steps in connection with flowchart 1000. For example, referring to FIG. 9, the UE 902 may compute, at 908, a burst threshold for a data stream. The burst threshold may be associated with a throughput of the data stream. Referring to FIG. 6, in the burst qualification step 606, the burst threshold 608 may be computed based on the throughput of the data steam, for example, based on Equation (1). Further, 1002 may be performed by the component 198.

At 1004, the UE may identify a set of bursts in the data stream based on the burst threshold. For example, referring to FIG. 9, the UE 902 may identify, at 910, a set of bursts in the data stream based on the burst threshold. Referring to FIG. 6, a set of bursts 610 may be identified in the data stream based on the burst threshold 608. Further, 1004 may be performed by the component 198.

At 1006, the UE may detect a pattern in the data stream based on the set of bursts. For example, referring to FIG. 9, the UE 902 may detect, at 912, a pattern in the data stream based on the set of bursts. Referring to FIG. 6, the UE may detect a pattern (e.g., detect whether a periodically stable pattern exists) in the data stream based on the set of bursts 610. Further, 1006 may be performed by the component 198.

At 1008, the UE may estimate at least one subsequent burst in the data stream based on the pattern and the burst threshold. For example, referring to FIG. 9, the UE 902 may estimate, at 916, at least one subsequent burst in the data stream based on the pattern and the burst threshold. Referring to FIG. 6, the burst predictor 618 may estimate at least one subsequent burst in the data stream based on the pattern and the burst threshold 608. Further, 1008 may be performed by the component 198.

At 1010, the UE may output an indication of the at least one subsequent burst in the data stream. In some examples, the UE may output the indication to a network entity. The network entity may be a base station, or a component of a base station, in the access network of FIG. 1 or a core network component (e.g., base station 102, 310, 904; or the network entity 1202 in the hardware implementation of FIG. 12). For example, referring to FIG. 9, the UE 902 may output, at 920, an indication of the at least one subsequent burst in the data stream. In some examples, the UE 902 may output the indication to a network entity (base station 904). Further, 1010 may be performed by the component 198.

FIG. 11 is a flowchart 1100 illustrating methods of data processing at a device in accordance with various aspects of the present disclosure. A UE is used as an example device in the description in connection with flowchart 1100. The UE may be the UE 104, 350, 902, or the apparatus 1204 in the hardware implementation of FIG. 12. The method may also be performed by a video streaming device, a base station, or a data streaming device, and this disclosure is not limited in this regard. The method enables a device to predict one or more future data bursts based on characteristics of existing data. The predicted data bursts allow the transmission resource and power to be adaptively arranged to significantly reduce power consumption and improve transmission efficiency.

As shown in FIG. 11, at 1102, the UE may compute a burst threshold for a data stream. The burst threshold is associated with a throughput of the data stream. FIGS. 6 and 9 illustrate various aspects of the steps in connection with flowchart 1100. For example, referring to FIG. 9, the UE 902 may compute, at 908, a burst threshold for a data stream. The burst threshold may be associated with a throughput of the data stream. Referring to FIG. 6, in the burst qualification step 606, the burst threshold 608 may be computed based on the throughput of the data steam, for example, based on Equation (1). Further, 1102 may be performed by the component 198.

At 1104, the UE may identify a set of bursts in the data stream based on the burst threshold. For example, referring to FIG. 9, the UE 902 may identify, at 910, a set of bursts in the data stream based on the burst threshold. Referring to FIG. 6, a set of bursts 610 may be identified in the data stream based on the burst threshold 608. Further, 1104 may be performed by the component 198.

At 1106, the UE may detect a pattern in the data stream based on the set of bursts. For example, referring to FIG. 9, the UE 902 may detect, at 912, a pattern in the data stream based on the set of bursts. Referring to FIG. 6, the UE may detect a pattern (e.g., detect whether a periodically stable pattern exists) in the data stream based on the set of bursts 610. Further, 1106 may be performed by the component 198.

At 1110, the UE may estimate at least one subsequent burst in the data stream based on the pattern and the burst threshold. For example, referring to FIG. 9, the UE 902 may estimate, at 916, at least one subsequent burst in the data stream based on the pattern and the burst threshold. Referring to FIG. 6, the burst predictor 618 may estimate at least one subsequent burst in the data stream based on the pattern and the burst threshold 608. Further, 1110 may be performed by the component 198.

At 1114, the UE may output an indication of the at least one subsequent burst in the data stream. In some examples, the UE may output the indication to a network entity. The network entity may be a base station, or a component of a base station, in the access network of FIG. 1 or a core network component (e.g., base station 102, 310, 904; or the network entity 1202 in the hardware implementation of FIG. 12). For example, referring to FIG. 9, the UE 902 may output, at 920, an indication of the at least one subsequent burst in the data stream. In some examples, the UE 902 may output the indication to a network entity (base station 904). Further, 1114 may be performed by the component 198.

In some aspects, at 1112, the UE may monitor for the at least one subsequent burst in the data stream after being configured to estimate the at least one subsequent burst. For example, referring to FIG. 9, the UE 902 may, at 918, monitor for the at least one subsequent burst in the data stream after being configured to estimate the at least one subsequent burst. Further, 1112 may be performed by the component 198.

In some aspects, the burst threshold for the data stream may be computed by: dividing the data stream in a time window into a plurality of data portions, where each data portion of the plurality of data portions has the same length, and the plurality of data portions are non-overlapping; calculating the DL throughput for each data portion of the plurality of data portions; and obtaining, based on the DL throughput for each data portion of the plurality of data portions, an indication of the burst threshold. For example, referring to FIG. 6, in the burst qualification step 606, when computing the burst threshold 608, the data stream in a time window may be divided into a plurality of data portions (non-overlapping windows). Each data portion (e.g., each non-overlapping window) may have the same length, and the plurality of data portions may be non-overlapping. The DL throughput for each data portion (e.g., each non-overlapping window) may be computed, and, based on the DL throughput for each data portion (e.g., each non-overlapping window), the burst threshold 608 may be computed, for example, based on Equation (1).

In some aspects, the indication of the burst threshold may be obtained by: setting an initial burst threshold as the highest DL throughput among the DL throughputs of the plurality of data portions; adjusting the initial burst threshold to a target burst threshold to cause a burst volume percentage computed based on the initial burst threshold to be greater than or equal to a target burst volume percentage; and setting the target burst threshold as the burst threshold. For example, referring to FIG. 6, when computing the burst threshold 608, an initial burst threshold as the highest DL throughput among the DL throughputs of the plurality of data portions (non-overlapping windows) may be set. The initial burst threshold may be adjusted (e.g., reduced) to a target burst threshold to cause a burst volume percentage (e.g., BIP in Equation (1)) computed based on the initial burst threshold to be greater than or equal to a target burst volume percentage (e.g., $\mathrm{BIP}_{target}$), and the target burst threshold may be set as the burst threshold.

In some aspects, the burst volume percentage may be a ratio of the number of the plurality of data portions whose DL throughput is larger than the initial burst threshold to the total number of the plurality of data portions. For example, referring to Equation (1), the burst volume percentage (e.g., BVP) may be a ratio of the number of the plurality of data portions whose DL throughput is larger than the initial burst threshold (e.g., burst_volume) to the total number of the plurality of data portions (e.g., total_volume).

In some aspects, the length of each data portion of the plurality of data portions may be based on the data stream, and the target burst volume percentage may be based on the data stream. For example, referring to FIG. 6 and Equation (1), the length of each data portion of the plurality of data portions (e.g., non-overlapping windows) may be based on the data stream, and the target burst volume percentage (e.g., $\mathrm{BIP}_{target}$) may be based on the data stream.

In some aspects, the set of bursts in the data stream may be identified by: comparing the DL throughput of each data portion of the plurality of data portions with the burst threshold; and identifying one or more consecutive portions in the plurality of data portions that have a DL throughput greater than the burst threshold as a burst of the set of bursts. For example, referring to FIG. 6, in the burst qualification step 606, the set of bursts 610 may be identified by comparing the DL throughput of each data portion of the plurality of data portions (e.g., non-overlapping windows) with the burst threshold 608, and one or more consecutive portions in the plurality of data portions (e.g., non-overlapping windows) that have a DL throughput greater than the burst threshold 608 may be identified as a burst of the set of bursts 610.

In some aspects, the pattern in the data stream may be detected by: obtaining a group of time gaps for the set of bursts, where each time gap in the group of time gaps is a time interval between adjacent bursts of the set of bursts; calculating a mean and a standard deviation for the group of time gaps; and detecting the pattern based on the mean and the standard deviation. For example, referring to FIG. 6 and Equation (2), the pattern detector 612 may detect the pattern by obtaining a group of time gaps for the set of bursts 610.

Each time gap in the group of time gaps may be a time interval between adjacent bursts of the set of bursts 610. The mean and the standard deviation for the group of time gaps may be computed, and the pattern may be detected based on the mean and the standard deviation, for example, based on Equation (2).

In some aspects, the pattern may be detected based on the mean and the standard deviation by: calculating a ratio of the standard deviation to the mean; and indicating the pattern is detected if the ratio is less than a target threshold. For example, referring to Equation (2), to detect the pattern based on the mean and the standard deviation, a ratio of the standard deviation to the mean (e.g., GapStdPc in Equation (2)) may be computed, and the pattern may be detected if the ratio (e.g., GapStdPc) is less than a target threshold Gap-StdPC$_{target}$.

In some aspects, the target threshold is based on the data stream. For example, referring to Equation (2), when comparing GapStdPe with the target threshold (GapStdPC$_{target}$), the target threshold (GapStdPC$_{target}$) may be based on the data stream.

In some aspects, the at least one subsequent burst in the data stream may be estimated by: estimating, in response to the pattern being detected, a minimum gap associated with the at least one subsequent burst, where the minimum gap is based on a percentile of the group of time gaps; and estimating, based on the minimum gap, the at least one subsequent burst. For example, referring to FIG. 6, when the burst predictor 618 predicts when the next burst will arrive, the burst predictor 618 may estimate the minimum time gap duration until the next burst will be predicted. The predicted minimum time gap duration may be based on a low percentile of the distribution of the gaps in order to avoid predicting a gap larger than the actual gap. The burst predictor 618 may estimate the next burst based on the minimum gap.

At 1108, the UE may remove, prior to being configured to estimate the minimum gap, one or more outlier time gaps from the group of time gaps. The one or more outlier time gaps may be time gaps outside of a given range, and the minimum gap may be based on the percentile of the group of time gaps after the one or more outlier time gaps are configured to be removed. For example, referring to FIG. 9, the UE 902 may remove, at 914, prior to being configured to estimate the minimum gap, one or more outlier time gaps from the group of time gaps. The one or more outlier time gaps may be time gaps outside of a given range, and the minimum gap may be based on the percentile of the group of time gaps after the one or more outlier time gaps are configured to be removed. Further, 1108 may be performed by the component 198.

In some aspects, the given range may be a range of the group of time gaps corresponding to Q1–1.5IQR to Q3+1.5IQR, where Q1 is approximately the 25th percentile of the group of time gaps, Q3 is approximately the 75$^{th}$ percentile of the group of time gaps, and IQR is an interquartile range of the group of time gaps. For example, referring to FIG. 9, when the UE 902 removes, at 914, one or more outlier time gaps from the group of time gaps, the UE 902 may remove the time gaps fall within a range of Q1–1.5IQR to Q3+1.5IQR, where Q1 is approximately the 25th percentile of the group of time gaps, Q3 is approximately the 75$^{th}$ percentile of the group of time gaps, and IQR is an interquartile range of the group of time gaps.

In some aspects, the pattern in the data stream may be a stable pattern associated with the set of bursts. The at least one subsequent burst may be estimated based on the stable pattern associated with the set of bursts. For example, referring to FIG. 6, the pattern detector 612 may detect whether a periodically stable pattern exists based on the burst threshold 608 and a set of bursts 610. If a periodically stable pattern exists, the burst predictor 618 may estimate at least one subsequent burst based on the stable pattern associated with the set of burst threshold 608.

In some aspects, the indication of the at least one subsequent burst in the data stream may be output by: transmitting, to a second device or another component associated with the device, the indication of the at least one subsequent burst in the data stream. For example, referring to FIG. 9, the UE 902 may output, at 920, the indication of the at least one subsequent burst to a base station 904. The UE 902 may also output the indication to a second device or another component associated with the device.

Figure 12:
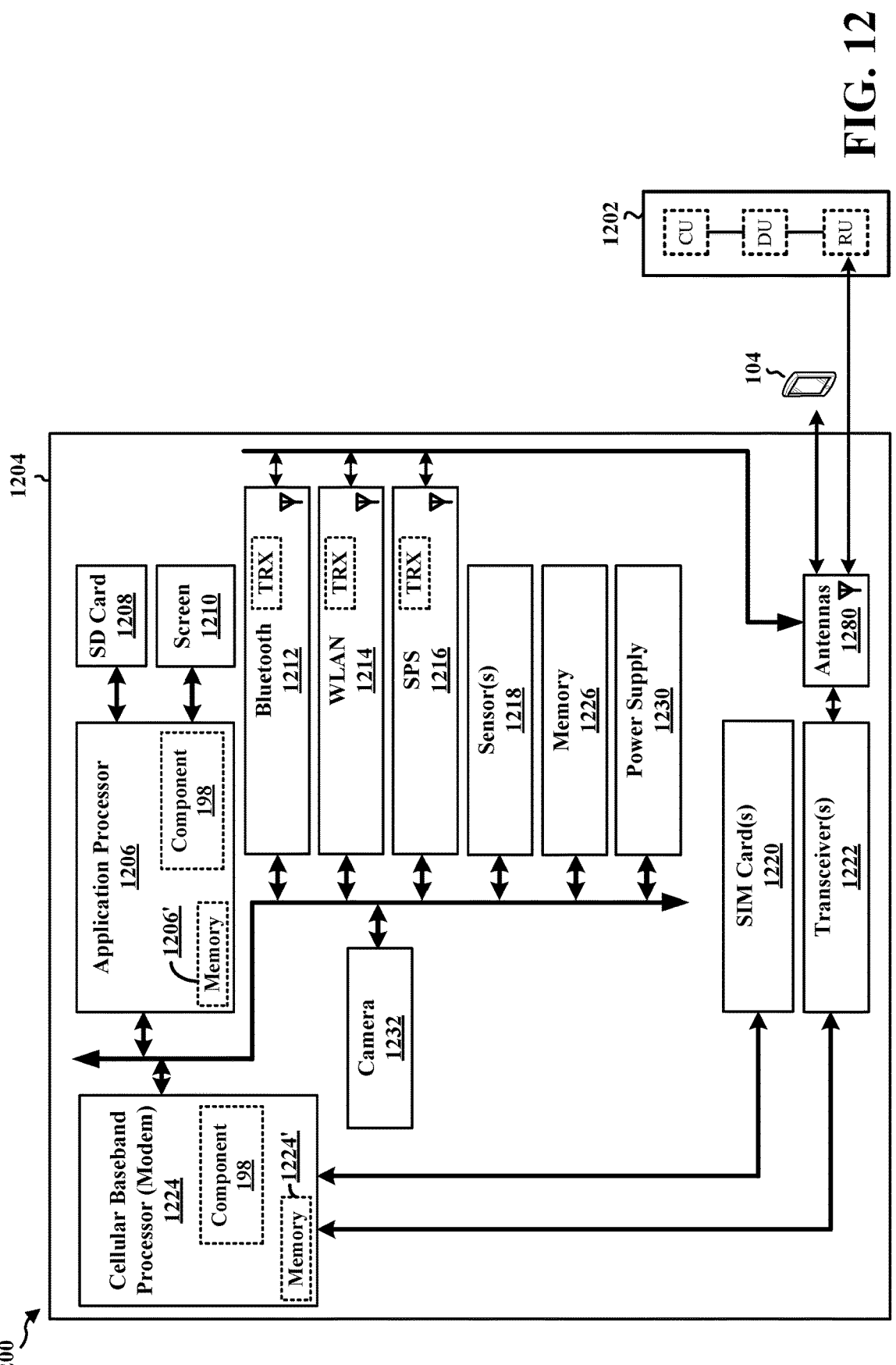
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be nontransitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the component 198 may be configured to compute a burst threshold for a data stream. The burst threshold may be associated with a throughput of the data stream. The component 198 may be further configured to identify a set of bursts in the data stream based on the burst threshold, detect a pattern in the data stream based on the set of bursts, estimate at least one subsequent burst in the data stream based on the pattern and the burst threshold, and output an indication of the at least one subsequent burst in the data stream. The component 198 may be further configured to perform any of the aspects described in connection with the flowcharts in FIG. 10 and FIG. 11, and/or performed by the UE 902 in FIG. 9. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for computing a burst threshold for a data stream. The burst threshold may be associated with a throughput of the data stream. The apparatus 1204 may further include means for identifying a set of bursts in the data stream based on the burst threshold, means for detecting a pattern in the data stream based on the set of bursts, means for estimating at least one subsequent burst in the data stream based on the pattern and the burst threshold, and means for outputting an indication of the at least one subsequent burst in the data stream. The apparatus 1204 may further include means for performing any of the aspects described in connection with the flowcharts in FIG. 10 and FIG. 11, and/or aspects performed by the UE 902 in FIG. 9. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
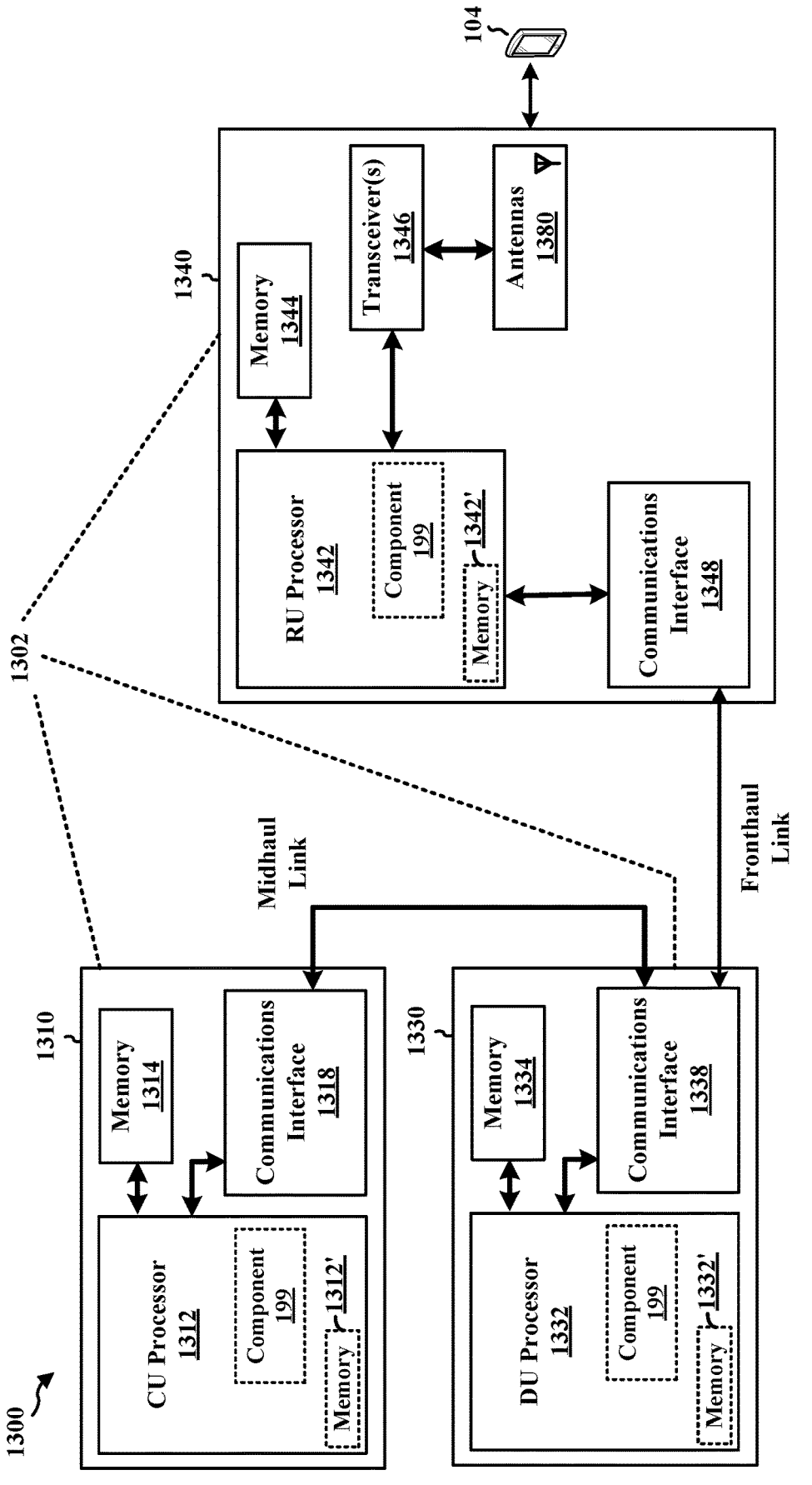
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to compute a burst threshold for a data stream. The burst threshold may be associated with a throughput of the data stream. The component 199 may be further configured to identify a set of bursts in the data stream based on the burst threshold, detect a pattern in the data stream based on the set of bursts, estimate at least one subsequent burst in the data stream based on the pattern and the burst threshold, and output an indication of the at least one subsequent burst in the data stream. The component 199 may be further configured to perform any of the aspects described in connection with the flowcharts in FIGS. 10 and 11, and/or performed by the base station 904 in FIG. 9. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for computing a burst threshold for a data stream. The burst threshold may be associated with a throughput of the data stream. The network entity 1302 may further include means for identifying a set of bursts in the data stream based on the burst threshold, means for detecting a pattern in the data stream based on the set of bursts, means for estimating at least one subsequent burst in the data stream based on the pattern and the burst threshold, and means for outputting an indication of the at least one subsequent burst in the data stream. The network entity 1302 may further include means for performing any of the aspects described in connection with the flowcharts in FIGS. 10 and 11, and/or aspects performed by the base station 904 in FIG. 9. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include computing a burst threshold for a data stream. The burst threshold may be associated with a throughput of the data stream. The method may further include identifying a set of bursts in the data stream based on the burst threshold; detecting a pattern in the data stream based on the set of bursts; estimating at least one subsequent burst in the data stream based on the pattern and the burst threshold; and outputting an indication of the at least one subsequent burst in the data stream. The method enables a device to predict one or more future data bursts based on characteristics of existing data. The predicted data bursts allow the transmission resource and power to be adaptively arranged to significantly reduce power consumption and improve transmission efficiency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of data processing at a device. The method may include computing a burst threshold for a data stream, where the burst threshold may be associated with a throughput of the data stream; identifying, based on the burst threshold, a set of bursts in the data stream; detecting, based on the set of bursts, a pattern in the data stream; estimating, based on the pattern and the burst threshold, at least one subsequent burst in the data stream; and outputting an indication of the at least one subsequent burst in the data stream.

Aspect 2 is the method of aspect 1, where the method may further include monitoring for the at least one subsequent burst in the data stream after being configured to estimate the at least one subsequent burst.

Aspect 3 is the method of any of aspects 1 to 2, where computing the burst threshold for the data stream may include: dividing the data stream in a time window into a plurality of data portions, where each data portion of the plurality of data portions has the same length, and the plurality of data portions are non-overlapping; calculating a DL throughput for each data portion of the plurality of data portions to obtain a plurality of DL throughputs; and obtaining, based on the DL throughput for each data portion of the plurality of data portions, an indication of the burst threshold.

Aspect 4 is the method of aspect 3, where obtaining the indication of the burst threshold may include: setting an initial burst threshold as the highest DL throughput among the plurality of DL throughputs of the plurality of data portions; adjusting the initial burst threshold to a target burst threshold to cause a burst volume percentage computed based on the initial burst threshold to be greater than or equal to a target burst volume percentage; and setting the target burst threshold as the burst threshold.

Aspect 5 is the method of aspect 4, where the burst volume percentage may be a ratio of the number of the plurality of data portions whose DL throughput is larger than the initial burst threshold to the total number of the plurality of data portions.

Aspect 6 is the method of aspect 4, where the length of each data portion of the plurality of data portions may be based on the data stream, and where the target burst volume percentage may be based on the data stream.

Aspect 7 is the method of aspect 4, where identifying the set of bursts in the data stream may include: comparing the DL throughput of each data portion of the plurality of data portions with the burst threshold; and identifying one or more consecutive portions in the plurality of data portions that have a DL throughput greater than the burst threshold as a burst of the set of bursts.

Aspect 8 is the method of aspect 7, where detecting the pattern in the data stream may include: obtaining a group of time gaps for the set of bursts, where each time gap in the group of time gaps is a time interval between adjacent bursts of the set of bursts; calculating a mean and a standard deviation for the group of time gaps; and detecting the pattern based on the mean and the standard deviation.

Aspect 9 is the method of aspect 8, where detecting the pattern based on the mean and the standard deviation may include: calculating a ratio of the standard deviation to the mean; and indicating the pattern is detected if the ratio is less than a target threshold.

Aspect 10 is the method of aspect 9, where the target threshold may be based on the data stream.

Aspect 11 is the method of aspect 8, where estimating the at least one subsequent burst in the data stream may include: estimating, in response to the pattern being detected, a minimum gap associated with the at least one subsequent burst, where the minimum gap is based on a percentile of the group of time gaps; and estimating, based on the minimum gap, the at least one subsequent burst.

Aspect 12 is the method of aspect 11, where the method may further include: removing, prior to being configured to estimate the minimum gap, one or more outlier time gaps from the group of time gaps. The one or more outlier time gaps may be time gaps outside of a given range, and the minimum gap may be based on the percentile of the group of time gaps after the one or more outlier time gaps are configured to be removed.

Aspect 13 is the method of aspect 12, where the given range may be a range of the group of time gaps corresponding to Q1−1.5IQR to Q3+1.5IQR, Q1 is approximately the $25^{th}$ percentile of the group of time gaps, Q3 is approximately the $75^{th}$ percentile of the group of time gaps, and IQR is an interquartile range of the group of time gaps.

Aspect 14 is the method of any of aspects 1 to 13, where the pattern in the data stream may be a stable pattern associated with the set of bursts, and estimating the at least one subsequent burst may include: estimating the at least one subsequent burst further based on the stable pattern associated with the set of bursts.

Aspect 15 is the method of any of aspects 1 to 14, where outputting the indication of the at least one subsequent burst in the data stream may include: transmitting, to a second device or another component associated with the device, the indication of the at least one subsequent burst in the data stream.

Aspect 16 is the method of any of aspects 1 to 15, where the device may be at least one of a UE, a base station, a video streaming device, or a data streaming device.

Aspect 17 is an apparatus for data processing. The apparatus may include a memory and at least one processor coupled to the memory and, based at least in part on information stored in the memory, the at least one processor is configured to perform the method of any of aspects 1-16.

Aspect 18 is the apparatus of aspect 17, further including at least one of a transceiver or an antenna coupled to the at least one processor and configured to output the indication of the at least one subsequence burst in the data stream.

Aspect 19 is an apparatus for data processing including means for implementing the method of any of aspects 1-16.

Aspect 20 is a computer-readable medium (e.g., a non-transitory computer-readable medium) storing computer executable code, where the code, when executed by a processor, causes the processor to implement the method of any of aspects 1-16.

What is claimed is:

1. An apparatus for data processing, comprising:
memory; and
at least one processor coupled to the memory and, based at least in part on information stored in the memory, the at least one processor is configured to:
compute a burst threshold for a data stream, wherein the burst threshold is associated with a throughput of the data stream;
identify, based on the burst threshold, a set of bursts in the data stream;
detect, based on the set of bursts, a pattern in the data stream;
estimate, based on the pattern and the burst threshold, at least one subsequent burst in the data stream; and
output an indication of the at least one subsequent burst in the data stream.

2. The apparatus of claim 1, further comprising a transceiver coupled to the at least one processor, wherein, to output the indication, the at least one processor is configured to output the indication via the transceiver.

3. The apparatus of claim 1, wherein the at least one processor is further configured to:
monitor for the at least one subsequent burst in the data stream after being configured to estimate the at least one subsequent burst.

4. The apparatus of claim 1, wherein, to compute the burst threshold for the data stream, the at least one processor is configured to:
divide the data stream in a time window into a plurality of data portions, wherein each data portion of the plurality of data portions has a same length and the plurality of data portions are non-overlapping;
calculate a downlink (DL) throughput for each data portion of the plurality of data portions to obtain a plurality of DL throughputs; and
obtain, based on the DL throughput for each data portion of the plurality of data portions, the indication of the burst threshold.

5. The apparatus of claim 4, wherein, to obtain the indication of the burst threshold, the at least one processor is configured to:
set an initial burst threshold as a highest DL throughput among the plurality of DL throughputs of the plurality of data portions;
adjust the initial burst threshold to a target burst threshold to cause a burst volume percentage computed based on the initial burst threshold to be greater than or equal to a target burst volume percentage; and
set the target burst threshold as the burst threshold.

6. The apparatus of claim 5, wherein the burst volume percentage is a ratio of a number of the plurality of data portions whose DL throughput is larger than the initial burst threshold to a total number of the plurality of data portions.

7. The apparatus of claim 5, wherein the length of each data portion of the plurality of data portions is based on the data stream, and wherein the target burst volume percentage is based on the data stream.

8. The apparatus of claim 5, wherein, to identify the set of bursts in the data stream, the at least one processor is configured to:

compare the DL throughput of each data portion of the plurality of data portions with the burst threshold; and identify one or more consecutive portions in the plurality of data portions that have a DL throughput greater than the burst threshold as a burst of the set of bursts.

9. The apparatus of claim 8, wherein, to detect the pattern in the data stream, the at least one processor is configured to:

obtain a group of time gaps for the set of bursts, wherein each time gap in the group of time gaps is a time interval between adjacent bursts of the set of bursts;

calculate a mean and a standard deviation for the group of time gaps; and detect the pattern based on the mean and the standard deviation.

10. The apparatus of claim 9, wherein, to detect the pattern based on the mean and the standard deviation, the at least one processor is configured to:

calculate a ratio of the standard deviation to the mean; and indicate the pattern is detected if the ratio is less than a target threshold.

11. The apparatus of claim 10, wherein the target threshold is based on the data stream.

12. The apparatus of claim 9, wherein, to estimate the at least one subsequent burst in the data stream, the at least one processor is configured to:

estimate, in response to the pattern being detected, a minimum gap associated with the at least one subsequent burst, wherein the minimum gap is based on a percentile of the group of time gaps; and estimate, based on the minimum gap, the at least one subsequent burst.

13. The apparatus of claim 12, wherein the at least one processor is further configured to:

remove, prior to being configured to estimate the minimum gap, one or more outlier time gaps from the group of time gaps, wherein the one or more outlier time gaps are time gaps outside of a given range, and wherein the minimum gap is based on the percentile of the group of time gaps after the one or more outlier time gaps are configured to be removed.

14. The apparatus of claim 13, wherein the given range is a range of the group of time gaps corresponding to: Q1−1.5IQR to Q3+1.5IQR, wherein Q1 is approximately a $25^{th}$ percentile of the group of time gaps, Q3 is approximately a $75^{th}$ percentile of the group of time gaps, and IQR is an interquartile range of the group of time gaps.

15. The apparatus of claim 1, wherein the pattern in the data stream is a stable pattern associated with the set of bursts, and wherein, to estimate the at least one subsequent burst, the at least one processor is configured to: estimate the at least one subsequent burst further based on the stable pattern associated with the set of bursts.

16. The apparatus of claim 1, wherein, to output the indication of the at least one subsequent burst in the data stream, the at least one processor is configured to: transmit, to a second device or another component associated with a device associated with the apparatus, the indication of the at least one subsequent burst in the data stream.

17. The apparatus of claim 1, wherein the apparatus is at least one of a user equipment (UE), a base station, a video streaming device, or a data streaming device.

18. A method of data processing at a device, comprising:

computing a burst threshold for a data stream, wherein the burst threshold is associated with a throughput of the data stream;

identifying, based on the burst threshold, a set of bursts in the data stream;

detecting, based on the set of bursts, a pattern in the data stream;

estimating, based on the pattern and the burst threshold, at least one subsequent burst in the data stream; and outputting an indication of the at least one subsequent burst in the data stream.

19. The method of claim 18, further comprising:

monitoring for the at least one subsequent burst in the data stream after estimating the at least one subsequent burst.

20. The method of claim 18, wherein computing the burst threshold for the data stream comprises:

dividing the data stream in a time window into a plurality of data portions, wherein each data portion of the plurality of data portions has a same length and the plurality of data portions are non-overlapping;

calculating a downlink (DL) throughput for each data portion of the plurality of data portions to obtain a plurality of DL throughputs; and obtaining, based on the DL throughput for each data portion of the plurality of data portions, the indication of the burst threshold.

21. The method of claim 20, wherein obtaining the indication of the burst threshold comprises:

setting an initial burst threshold as a highest DL throughput among the plurality of DL throughputs of the plurality of data portions;

adjusting the initial burst threshold to a target burst threshold to cause a burst volume percentage computed based on the initial burst threshold to be greater than or equal to a target burst volume percentage; and setting the target burst threshold as the burst threshold.

22. The method of claim 21, wherein the burst volume percentage is a ratio of a number of the plurality of data portions whose DL throughput is larger than the initial burst threshold to a total number of the plurality of data portions, and wherein the length of each data portion of the plurality of data portions is based on the data stream, and wherein the target burst volume percentage is based on the data stream.

23. The method of claim 21, wherein identifying the set of bursts in the data stream comprises:

comparing the DL throughput of each data portion of the plurality of data portions with the burst threshold; and identifying one or more consecutive portions in the plurality of data portions that have a DL throughput greater than the burst threshold as a burst of the set of bursts.

24. The method of claim 23, wherein detecting the pattern in the data stream comprises:

obtaining a group of time gaps for the set of bursts, wherein each time gap in the group of time gaps is a time interval between adjacent bursts of the set of bursts;

calculating a mean and a standard deviation for the group of time gaps; and detecting the pattern based on the mean and the standard deviation.

25. The method of claim 24, wherein detecting the pattern based on the mean and the standard deviation comprises:

calculating a ratio of the standard deviation to the mean; and indicating the pattern is detected if the ratio is less than a target threshold, wherein the target threshold is based on the data stream.

26. The method of claim 24, wherein estimating the at least one subsequent burst in the data stream comprises:

estimating, in response to the pattern being detected, a minimum gap associated with the at least one subsequent burst, wherein the minimum gap is based on a percentile of the group of time gaps; and estimating, based on the minimum gap, the at least one subsequent burst.

27. The method of claim 26, further comprising:

removing, prior to estimating the minimum gap, one or more outlier time gaps from the group of time gaps, wherein the one or more outlier time gaps are time gaps outside of a given range, and wherein the minimum gap is based on the percentile of the group of time gaps after the one or more outlier time gaps are removed, wherein the given range is a range of the group of time gaps corresponding to: Q1–1.5IQR to Q3+1.5IQR, wherein Q1 is approximately a $25^{th}$ percentile of the group of time gaps, Q3 is approximately a $75^{th}$ percentile of the group of time gaps, and IQR is an interquartile range of the group of time gaps.

28. The method of claim 18, wherein the pattern in the data stream is a stable pattern associated with the set of bursts, wherein estimating the at least one subsequent burst comprises:

estimating the at least one subsequent burst further based on the stable pattern associated with the set of bursts, and wherein outputting the indication of the at least one subsequent burst in the data stream comprises:

transmitting, to a second device or another component associated with the device, the indication of the at least one subsequent burst in the data stream.

29. An apparatus for data processing, comprising:

means for computing a burst threshold for a data stream, wherein the burst threshold is associated with a throughput of the data stream;

means for identifying, based on the burst threshold, a set of bursts in the data stream;

means for detecting, based on the set of bursts, a pattern in the data stream;

means for estimating, based on the pattern and the burst threshold, at least one subsequent burst in the data stream; and means for outputting an indication of the at least one subsequent burst in the data stream.

30. A non-transitory computer-readable medium storing computer-executable code for data processing, the code when executed by a processor causes the processor to:

compute a burst threshold for a data stream, wherein the burst threshold is associated with a throughput of the data stream;

identify, based on the burst threshold, a set of bursts in the data stream;

detect, based on the set of bursts, a pattern in the data stream;

estimate, based on the pattern and the burst threshold, at least one subsequent burst in the data stream; and output an indication of the at least one subsequent burst in the data stream.

* * * * *